Jan. 19, 1960 W. G. CARTER 2,921,806
SHAFT SEAL
Filed Nov. 8, 1955 2 Sheets-Sheet 1
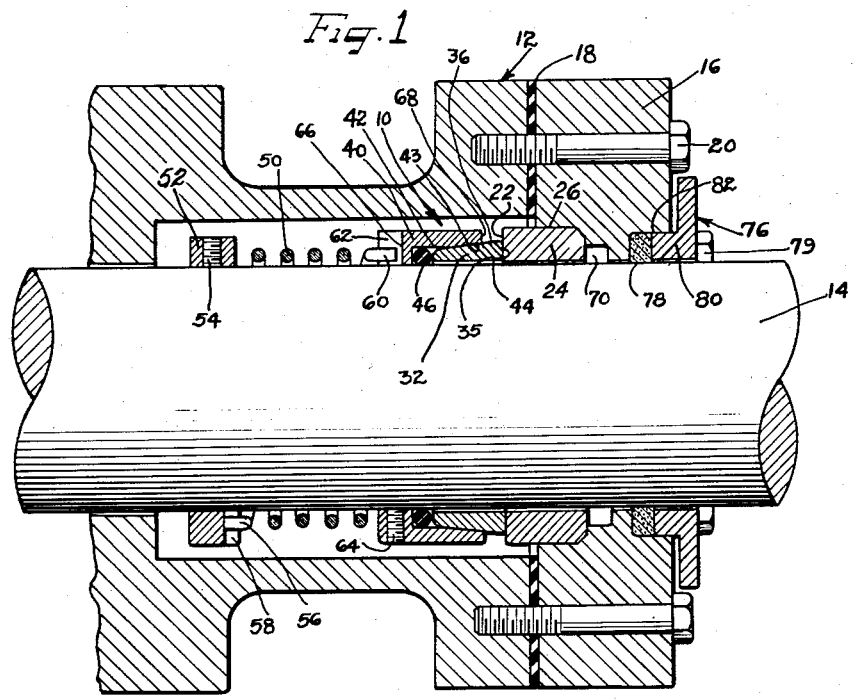
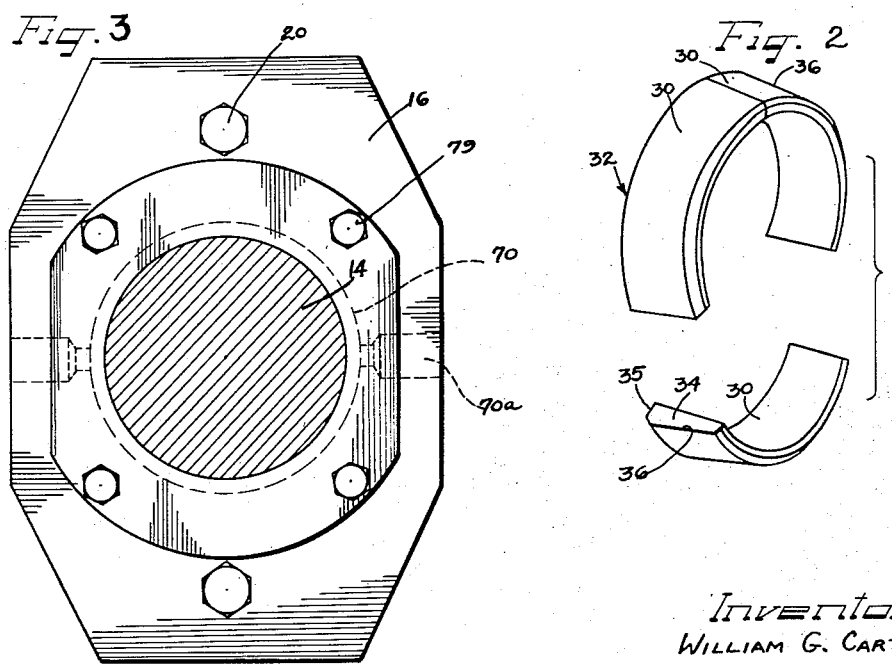
Inventor
WILLIAM G. CARTER Jan. 19, 1960 W. G. CARTER 2,921,806
SHAFT SEAL
Filed Nov. 8, 1955 2 Sheets-Sheet 2
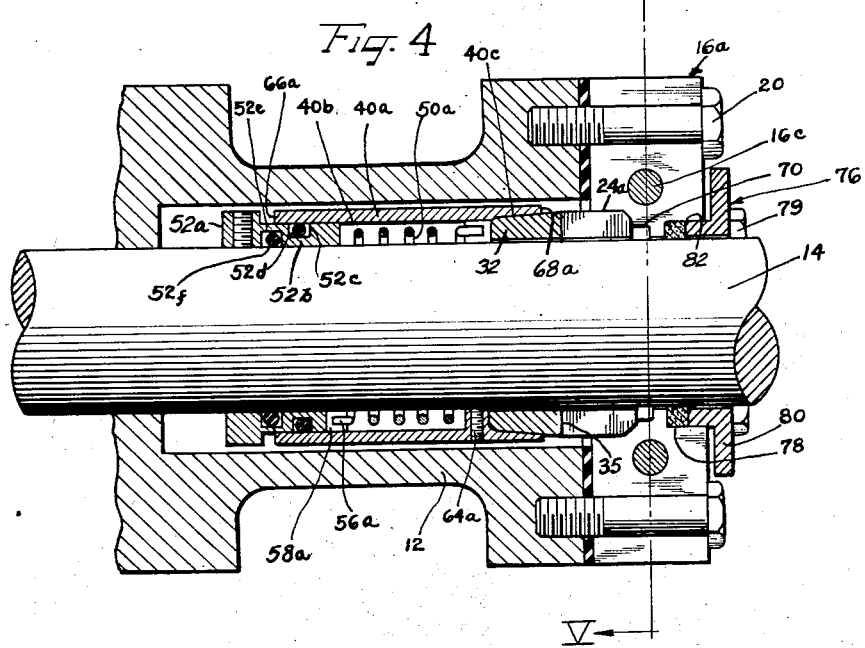
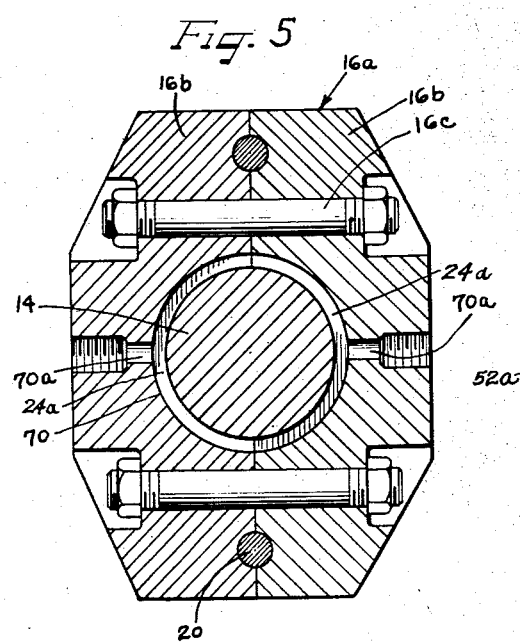
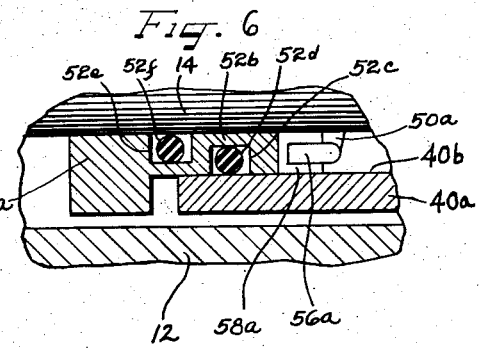
Inventor
WILLIAM G. CARTER
Attys.

United States Patent Office 2,921,806
Patented Jan. 19, 1960

2,921,806

SHAFT SEAL

William G. Carter, Long Beach, Calif.

Application November 8, 1955, Serial No. 545,722

4 Claims. (Cl. 286—11.15)

This invention relates to shaft seals, and particularly to seals for rotating shafts.

The present application is a continuation-in-part of my copending application Serial No. 364,555, filed June 29, 1953, now abandoned.

It is an object of this invention to provide new and improved means for sealing a casing wall or like structure against leakage of fluid along a revolving shaft which extends through such a structure, to provide a substantially fluid-tight connection.

It is a more specific object of my invention to provide novel means for sealing a shaft, which will maintain a substantially fluid-tight seal about the shaft even under conditions of high temperature and pressure.

It is a further object of my invention to provide a shaft seal wherein the parts thereof which sustain the most wear, and hence are most subject to servicing and replacement, are readily serviced or replaced, without the necessity of complete disassembly or tear-down of associated parts of an installation in which a shaft seal is employed.

A further object of my invention is the provision of a new and improved shaft seal of economical construction, which will provide good wearing qualities, and which provides for ready access for servicing, yet which does an effective job of sealing against leakage along a revolving or rotating shaft.

Other objects, features and advantages of my invention with reference to a general and specific improvement of shaft seals, will be readily apparent from the following description of certain preferred embodiments thereof, taken in conjunction with the accompanying drawings, in which:

Figure 1 is a longitudinal cross-section with parts in elevation of a shaft seal and related parts, according to one preferred embodiment of my invention;

Figure 2 is a partly exploded, perspective view of a carbon ring sealing means according to the embodiment of Figure 1;

Figure 3 is an end elevation of the structure shown in Figure 1;

Figure 4 is a longitudinal cross-section similar to Figure 1, but illustrating another preferred embodiment;

Figure 5 is a transverse section taken generally along the line V—V of Figure 4; and Figure 6 is an enlarged detail view of a portion of Figure 4.

As shown on the drawings:

Figures 1, 2 and 3 illustrate a shaft seal 10 according to a preferred embodiment of my invention in association with a casing 12, as of a pump or other device, containing fluid under pressure and through which a shaft 14 is adapted to extend. A cap or gland 16 having a suitable gasket 18 is adapted, as by bolts 20, to be secured to the end wall or face of the casing 12, and a seal assembly indicated as a whole by the reference numeral 10, is adapted to seal against the gland 16 by means now to be described to block fluid flow from the interior of the casing 12.

More specifically, in the embodiments illustrated, the seal assembly 10 seals against a smooth, plane, annular face 22 of a ring-like collar which can be an integral part of the gland 16 or a sleeve 24 carried by the gland 16 as an insert therein. The face may be hardened if desired. The employment of a separate piece such as the sleeve insert 24 to provide the plane surface for thrust sealing purposes permits a more economical replacement of that seal surface if and when it becomes worn, and it is a preferred construction. Although its provision as a unitary ring is not necessary, it is so shown in the embodiment illustrated in Figure 1, and is desirably held in the gland 16 by a press fit thereof in a bored-out recess 26 provided in the gland face presented inwardly toward the seal assembly 10.

Shown best in Figure 2, the parts of the seal assembly 10 which are adapted to sealingly engage the gland-face 22 are a plurality of arcuate segments 30 adapted when held in an integrated relationship to form a sealing ring 32 providing a circumferentially continuous end sealing surface 35. To this end, the side, or radial faces 34 of the segments 30 are made very true to provide a tight sealing contact between adjacent faces 34 of the adjacent segments so as to effect a circumferentially continuous sealing ring which is fluid-tight at these joints. As shown, the sealing ring 32 preferably comprises three segments 30. These segments 30, and hence the sealing ring 32 which they comprise, are desirably formed from carbon, to provide good wearing and sealing characteristics in thrust cooperation with the insert face 22 against which they bear. The multiple part sealing ring 32 provided by the discrete segments 30 provides easy replacement of the ring 32, for when the gland 16 is backed off, as by withdrawal of the bolts 20, the segments may be withdrawn radially of the shaft 14.

Means are provided to hold the segments 30 in assembled relation to constitute the integrated sealing ring 32, and to maintain that ring 32 in sealing relation with the insert face 22. To this end, the outer periphery 36 of the segments 30 is provided with a slight inward taper in a direction away from the sealing face 35. A retaining ring or collar 40 is provided, and the forward face of the collar 40 is provided with an enlarged bore 42 which receives the segmental ring 32. The forward portion of the bore 42 is provided with a forwardly and outwardly tapered inner surface 43 to provide a tight wedging mating of the juxtaposed surfaces of the sealing ring 32 and the collar 40, thereby effecting a seal between the adjacent surfaces 34 of the segments of said ring, and also effecting a fluid-tight mating of the outer periphery 36 of the segmental ring 32 and the inner surface 43 of the collar 40.

The collar 40 is carried on the shaft 14 for controlled movement by means yet to be described, and carries the segmental sealing ring 32 disposed about the shaft 14. It should be here noted that the segments 30 are formed with an internal diameter slightly larger than the diameter of the shaft 14 to provide clearance 44 when assembled, as indicated on the drawings somewhat exaggeratedly for purposes of illustration, between the sealing ring 32 and shaft 14. The clearance 44 is effective to prevent any binding between the shaft 14 and collar 40 by ring 32 which would interfere with the desired operation of collar 40 in presenting the the sealing ring 32 in tight sealing contact with the gland 16 or the insert 24 thereof, or with the extension of gland 16 when an integral part is used. Moreover, the clearance 44 assures that segments may be wedged into the bore of collar 40 with a force sufficient to assure a tight sealing engagement of the side faces 34 of adjacent segments 30, even though wear occurs on the end face 35. An annular resilient seal 46, such as an O-ring, is provided at the radially extending shoulder forming the bottom of the collar bore 42 in the chamber between that shoulder, the bore 42, the segmental ring 32, and the shaft 14, to block leakage of pressure fluid past the collar 40.

A coiled spring 50 is placed under compression to urge the collar 40 and the sealing ring 32 into sealing relationship with the insert 24 and gland 16. As shown, the spring 50 is bottomed against a collar 52 fixed to the shaft 14, as by one or more set screws 54, the end of the spring 50 being bent logitudinally to provide a finger 56 disposed in a radially extending groove or recess 58 provided in the fixed collar 52 to effect a driving relation of the spring 50 by shaft 14. The forward end of the spring 50 bears against the collar 40, biasing collar 40 toward the gland 16. A driving relation of collar 40 is effected by a finger 60 bent longitudinally from that end of spring 50 and received in a recess 62 provided in the collar 40. Thus, the fixed collar 52, spring 50, collar 40, annular seal 46, and sealing ring 32 all revolve with the shaft 14 and are in a positive driven relationship with said shaft, with the sealing ring 32 being biased into sealing engagement with the gland-insert face 22 by the spring 50. It may be pointed out here that although the collar 40 is provided with one or more openings 64 drilled and tapped to accommodate an associated set screw or screws, the set screws during normal operating condition of the seal do not engage the shaft 14 but are backed away therefrom. Accordingly, it will be understood that the collar 40 is free to respond to the axial urging, as by the force of the spring 50 and by fluid pressure means now to be described, to urge the sealing ring 32 into sealing relation with the gland 16.

It should be noted that the pressure of the fluid within the casing 12 assists the spring 50 in urging the collar along the shaft 14, by virtue of the greater area of the rearward face 66 of the collar 40 than the area of the forward face 68 of said collar. Accordingly, the fluid pressure in casing 12 effectuates an outward force on the collar 40, that force being dependent upon the magnitude of the liquid pressure and the difference in the annular areas 66 and 68. Particularly with high pressures of fluid in the casing 12, the outward biasing force so effected by fluid pressure becomes quite substantial, and provides a substantial boost to the bias effected by the spring 50.

At high operating pressures of the fluid within the casing 12, the outward bias so effected by fluid pressure may become undesirably excessive, forcing the sealing ring 32 against the gland-face 22 so tightly that excessive or undue wear results. One feature of the modification illustrated in Figs. 4, 5 and 6, is the provision of a construction in which the biasing influence effected by fluid pressure is reduced, with the parts adapted to exert a pressure compensating effect. As there shown, the retaining collar for the sealing segments 30 takes the form of an elongated sleeve 40a provided with a bore 40b which may be cylindrical throughout most of its length rearwardly of the bore front portion 40c, which front portion 40c corresponds to the tapered seat of the collar 40 for sealingly receiving a peripherally tapered segmental sealing ring 32, as in the first embodiment described. In this arrangement the rear end face 66a of the sleeve 40a presents an area differential with respect to the forward sleeve face 68a quite less than that of the end faces 66 and 68 of the collar 40 in the earlier described embodiment.

As illustrated in Figure 4 the fixed collar 52a, against which the biasing spring 50a is bottomed, is provided with a forward extension 52b which projects into the rear portion of the bore 40b of the sleeve 40a to cooperate with the rear portion of the sleeve 40a. As shown, the projecting portion 52b is provided with an outwardly facing, annular groove 52c, in which is disposed an annular seal 52d for providing a seal between the collar projection 52b and the sleeve bore 40b. It should be noted that the sleeve 40a slides relative to the collar projection 52b under bias of the fluid pressure and of the spring 50a disposed within sleeve 40a. The collar 52a is also provided with an inwardly facing annular groove 52e in which is disposed a second annular seal 52f for blocking fluid flow along the shaft 14 past the collar 52a and its annular projection 52b. The annular seals 52d and 52f are suitably flexible resilient rings of natural or artificial rubber, or plastic compounds, such as O-rings.

Thus, as shown in Figure 4, the sealing ring 32 is biased by the spring 50a and by the fluid pressure as it may be rendered effective by reason of the differential between the areas 66a and 68a of the sleeve 40a. It will be understood that the relative diameters of the rear face 66a of the sleeve 40a, the area of the surface 68a at the front end of the sleeve 40a, and the area of surface 35 may be interrelated as desired to obtain the desired fluid pressure sealing bias in accordance with the range of operating pressures to which the seal is to be subjected.

The embodiment illustrated in Figures 4, 5 and 6, also illustrates a modified gland 16a. In this embodiment, the gland 16a is comprised of two mating sections 16b adapted to be secured together by bolts 16c, preferably tapered bolts, to present an integral gland 16a. This segmental construction cooperates with the segmental construction of the sealing ring 32 to facilitate access to, and service and replacement of, the segments 30. In this arrangement, to obtain access to the sealing ring 32, or to the ring 24a, the user need only release the bolts 16c and withdraw the gland sections 16b radially from the shaft 14. This provides access to the wearing parts without the requirement of backing off the gland 16a as would be required in removal of the unitary gland 16 illustrated in Figures 1 and 3.

In the split-gland embodiment of Figures 4 and 5, it should be noted that the annular thrust sealing face against which the segments 30 face is desirably composed of two mating sections 24a which are removable radially from the shaft in like manner as are the gland sections 16b. This provides that the sealing sections 24a may be removed, as for re-conditioning, without dismantling of the pump. As shown, the sections 24a are shown as insert pieces carried by the gland sections 16b, but they may be made integral with the gland sections 16b.

Both embodiments provide means for refacing the sealing rings 32. For this purpose, each of the retaining collars 40—40a is provided with one or more openings 64—64a drilled and tapped to accommodate a set screw or screws. In refacing a ring 32, withdrawal of the gland 16—16a permits the spring 50—50a to push the ring 32 outwardly with respect to the casing. The set screws in the tapped openings 64—64a may then be tightened onto the shaft 14. The segments can then be refaced by any desired facing means, without removal of the ring segments 30 from the shaft 14, the shaft 14 desirably providing the power means to bring those segments into facing contact with the facing tool.

Both embodiments illustrate means for admitting auxiliary liquid to the seal, so as to cool the seal assembly and to provide a safety seal to eliminate hazardous fumes. As shown, such means comprise an annular groove 70 provided in the gland adjacent and forwardly of the ring insert 24 or ring 24a and in fluid-flow contact therewith. Radial passageways 70a are provided in the gland to communicate the groove 70 with an associated source of the auxiliary fluid to be used. Ordinarily, the fluid for this purpose will be at a relatively lower pressure then the fluid in the casing 12, and an auxiliary packing means 76, which may comprise conventional packing 78 clamped, as by bolts 79, between a packing gland 80 and an annular recess 82 provided at the outer end of the gland 16, is effective to block any leakage of such auxiliary fluid.

Thus it will be seen from the foregoing description of two preferred embodiments of my invention, considered in conjunction with the accompanying drawings, that my invention possesses desired advantages and characteristics, providing an effective shaft seal by new and improved means, accomplishing its intended objects including those hereinbefore pointed out and others which are inherent in the invention as described.

It will be understood that modifications and variations may be effected without departing from the scope of the novel concepts of the present invention.

I claim as my invention:

1. A sealing assembly for sealing an apertured plate and a rotatable shaft extending therethrough against the flow of a fluid under pressure along said shaft past said plate, which comprises a gland secured to said plate and providing an annular plane sealing surface about said shaft, a collar secured to said shaft and provided with radially inwardly and outwardly opening annular grooves, flexible resilient shaft sealing rings disposed in said grooves, a retainer ring freely disposed about said shaft between said collar and said gland and having an outwardly tapered inner wall confronting said gland and a rearwardly extending cylindrical sleeve telescopingly receiving said outwardly opening groove in contact with the sealing ring therein, a segmented sealing ring freely mounted on said shaft and having conformingly tapered outer surfaces wedgingly received by said outwardly tapered inner wall to effect a circumferentially continuous integrated ring, the end of said segmented ring confronting said annular plane surface being also plane for sealing contact therewith, and a coiled spring secured to said collar at one end and to said retainer at the other end to drive said retainer from said shaft and to bias said segmental sealing ring into pressure sealing contact with said annular plane sealing surface.

2. A sealing assembly for sealing an apertured plate and a rotatable shaft extending therethrough against the flow of a fluid under pressure along said shaft past said plate, which comprises a split gland secured to said plate and providing an annular plane sealing surface about said shaft, a collar secured to said shaft and provided with radially inwardly and outwardly opening annular grooves, flexible resilient shaft sealing rings disposed in said grooves, a retainer ring freely disposed about said shaft between said collar and said gland and having an outwardly tapered inner wall confronting said gland and a rearwardly extending cylindrical sleeve telescopingly receiving said outwardly opening groove in contact with the sealing ring therein, a segmented sealing ring freely mounted on said shaft and having conformingly tapered outer surfaces wedgingly received by said outwardly tapered inner wall to effect a circumferentially continuous integrated ring, the end of said segmented ring confronting said annular plane surface being also plane for sealing contact therewith, and a coiled spring secured to said collar at one end and to said retainer at the other end to drive said retainer from said shaft and to bias said segmental sealing ring into pressure sealing contact with said annular plane sealing surface, said retainer ring having means releasably securing said retainer ring to said shaft to enable said segmented sealing ring to be faced while on said shaft after removal of said split gland.

3. In a shaft seal for sealing a casing plate or the like along a revolving shaft extending therethrough, a split gland secured to said plate, a coiled spring disposed about said shaft and having one end thereof operatively secured thereto, a retainer ring disposed about said shaft and operatively receiving the other end of said spring in driven relationship from said shaft and urged by said spring along said shaft toward said gland, said gland carrying a smooth annular surface presented towards said retainer ring, a segmental sealing ring comprising a plurality of discrete ring segments held in ring-forming relationship by said retainer ring and freely disposed about said shaft for movement therealong with their end faces pressed into sealing relationship with said annular surface, and means associated with said retainer ring for releasably securing the same to said shaft to enable said segmental sealing ring to have their end faces refaced without removal from said shaft after removal of said split gland.

4. In a shaft seal for sealing a casing plate or the like along a revolving shaft extending therethrough, a gland secured to said plate, a sleeve insert in the inner face portion of said gland providing an inwardly directed, radially extending plane bearing surface, a collar disposed about said shaft and operatively secured thereto in fixed spaced relationship to said sleeve insert, a retainer ring freely disposed about said shaft between said collar and said sleeve insert, said retainer ring being formed with an inner annular wall divergently tapered outwardly toward the bearing surface on said sleeve insert, a coiled spring disposed about said shaft between said collar and said retainer ring and operatively connected to said collar and to said retainer ring at its respective ends to effect a driving relationship therebetween and to urge said retainer ring along said shaft toward said gland, a segmental sealing ring freely disposed about said shaft between said retainer ring and said sleeve insert and biased by said spring into sealing relationship with said bearing surface on said sleeve insert, said segmental sealing ring being formed with an outer annular surface cooperatively tapered with respect to the taper on the inner annular wall of said retainer ring, thereby wedgingly engaging therewith to urge said sealing ring segments into sealing relationship with said sleeve insert, and flexible sealing means in the collar for sealing the collar to the shaft and for sealing the collar to the retainer ring.

References Cited in the file of this patent

UNITED STATES PATENTS

| | | |
|---|---|---|
| 1,013,745 | Clark | Jan. 2, 1912 |
| 1,898,278 | Weis | Feb. 21, 1933 |
| 1,926,006 | Kohler | Sept. 5, 1933 |